(12) United States Patent  
Matsuno et al.

(10) Patent No.: US 10,747,229 B2  
(45) Date of Patent: Aug. 18, 2020

(54) ENVIRONMENT ARRANGEMENT ROBOT AND CONTROL PROGRAM THEREOF

(71) Applicant: TOYOTA JIDOSHA KABUSHIKI KAISHA, Toyota-shi, Aichi-ken (JP)

(72) Inventors: Nobuyuki Matsuno, Miyoshi (JP); Hidenori Yabushita, Seto (JP); Kazuhito Tanaka, Toyota (JP); Shintaro Yoshizawa, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 304 days.

(21) Appl. No.: 15/936,680

(22) Filed: Mar. 27, 2018

(65) Prior Publication Data

US 2018/0314265 A1 Nov. 1, 2018

(30) Foreign Application Priority Data

Apr. 27, 2017 (JP) .................................. 2017-088871

(51) Int. Cl.
*G05D 1/02* (2020.01)
*B25J 5/00* (2006.01)
*B25J 9/16* (2006.01)

(52) U.S. Cl.
CPC ............ *G05D 1/0221* (2013.01); *B25J 5/007* (2013.01); *B25J 9/162* (2013.01); *G05D 1/0246* (2013.01); *G05D 1/0248* (2013.01); *G05D 1/0274* (2013.01); *G05B 2219/25062* (2013.01); *G05B 2219/31007* (2013.01); *G05B 2219/31034* (2013.01); *G05B 2219/40506* (2013.01); *G05D 2201/0216* (2013.01); *Y10S 901/01* (2013.01); *Y10S 901/27* (2013.01); *Y10S 901/47* (2013.01); *Y10S 901/49* (2013.01)

(58) Field of Classification Search
CPC ..................................... G05D 1/02; B25J 5/00
See application file for complete search history.

(56) References Cited

U.S. PATENT DOCUMENTS

| 2010/0049391 A1* | 2/2010 | Nakano | G05D 1/024 701/23 |
| 2011/0010033 A1* | 1/2011 | Asahara | G05D 1/024 701/26 |
| 2011/0178669 A1* | 7/2011 | Tanaka | G05D 1/0272 701/25 |

(Continued)

FOREIGN PATENT DOCUMENTS

JP 2014-203145 A 10/2014

*Primary Examiner* — Kira Nguyen
(74) *Attorney, Agent, or Firm* — Sughrue Mion, PLLC (57) ABSTRACT

An environment arrangement robot includes a map creation unit that divides the target space into a plurality of cell spaces and provides an evaluation value to each of the cell spaces, in which the evaluation value indicates a probability of whether or not there is an object in the corresponding cell space, and an environment change unit that changes, among the plurality of cell spaces, a specific cell space having the evaluation value within a range evaluated that the probability of whether or not there is an object in the specific cell is low in such a way that the probability that the object is present will become greater or change a surrounding cell space in such a way that the specific cell space will be excluded from the measurement by the distance sensor.

10 Claims, 9 Drawing Sheets

(56) References Cited

U.S. PATENT DOCUMENTS

| | | | |
|---|---|---|---|
| 2011/0178709 A1* | 7/2011 | Park | G09B 29/00 |
| | | | 701/300 |
| 2012/0158178 A1* | 6/2012 | Hyung | B25J 9/1666 |
| | | | 700/255 |
| 2013/0226344 A1* | 8/2013 | Wong | G05D 1/024 |
| | | | 700/258 |
| 2015/0314443 A1* | 11/2015 | Yu | G06T 7/579 |
| | | | 701/28 |

* cited by examiner

ENVIRONMENT ARRANGEMENT ROBOT AND CONTROL PROGRAM THEREOF

CROSS REFERENCE TO RELATED APPLICATIONS

This application is based upon and claims the benefit of priority from Japanese patent application No. 2017-88871, filed on Apr. 27, 2017, the disclosure of which is incorporated herein in its entirety by reference.

BACKGROUND

The present disclosure relates to an environment arrangement robot and a control program thereof.

There is known a technique in which a mobile robot moving autonomously creates and updates an environment map while calculating its own location together with its reliability (see, for example, Japanese Unexamined Patent Application Publication No. 2014-203145).

SUMMARY

When the autonomous mobile robot autonomously moves while estimating its own location with reference to the created environment map, if there is a part of the environment map with low reliability, the mobile robot sometimes cannot accurately recognize the current location and thus unable to reach a destination.

The present disclosure has been made to solve such a problem. The present disclosure provides an environment arrangement robot that creates an environment map of a target space in which a mobile robot autonomously moves and also arranges an environment of the target space so that the mobile robot can accurately estimate its own location.

A first example aspect of the present disclosure is an environment arrangement robot for arranging an environment of a target space in which a mobile robot autonomously moves. The environment arrangement robot includes: a movement mechanism for autonomous movement; a distance sensor configured to measure a distance to an object present nearby; a map creation unit configured to divide the target space into a plurality of cell spaces and provide an evaluation value to each of the cell spaces based on a result of the measurement of the distance sensor obtained while the environment arrangement robot autonomously moves in the target space to thereby create an environment map of the target space, the evaluation value indicating a probability of whether or not there is an object in the corresponding cell space; and an environment change unit configured to change, among the plurality of cell spaces, a specific cell space having the evaluation value within a range evaluated that the probability of whether or not there is an object in the specific cell space is low in such a way that the probability that the object is present will become greater or change a surrounding cell space in such a way that the specific cell space will be excluded from the measurement by the distance sensor.

When the target space is arranged by such an environment arrangement robot, the autonomous mobile robot that autonomously moves later on can easily recognize the target space, and by referring to the environment map created by the environment arrangement robot, the autonomous movement robot can estimate its own location more accurately. Consequently, the autonomous mobile robot can reach a destination more reliably.

Further, in the above-described environment arrangement robot, the map creation unit may update the evaluation value of the specific cell space and the evaluation value of a cell near the specific cell space changed by the environment change unit based on a remeasurement result of the distance sensor. By reevaluating the space thus arranged, it is possible to create the latest environment map. The environment arrangement robot may further include a transmission unit configured to transmit the environment map created by the map creation unit to the mobile robot that autonomously moves in the target space later on. If the environment map can be shared as soon as possible, efficiency of works carried out by mobile robots improves.

The above-mentioned environment map may be a map of one horizontal cross section of the target space. The main purpose of using the environment map created by the environment arrangement robot is to estimate a location of the autonomous movement robot. Thus, the environment map may include surrounding information to enable the autonomous mobile robot to estimate its own location. By limiting the map created in this way to one horizontal section of the target space, the environment arrangement robot can quickly create the environment map.

Moreover, the environment change unit may attempt to attach a predetermined attaching object to the specific cell space or to dispose materials for shielding the specific cell space. For example, when an opaque attaching object is attached to a transparent glass door, the distance sensor can easily recognize the glass door, and thus the probability of whether or not there is an object in the specific cell space is improved. When the materials are placed in the surrounding cell space to shield the specific cell space, the autonomous mobile robot moving in the target space later on does not need to evaluate as to whether or not there is an object in the specific cell space. This enables the autonomous mobile robot to estimate its own location more accurately.

Further, when the environment arrangement robot includes a notification unit configured to notify, when the change of the cell space targeted by the environment change unit fails, a user of the failure, the user can change the environment by himself/herself. Even when the environment arrangement robot cannot change the environment, if the user changes the environment, the autonomous mobile robot that autonomously moves later on can easily recognize the target space.

After the map creation unit creates the environment map until a predetermined condition is satisfied, the environment arrangement robot moves to near the specific cell space, and the environment change unit executes the change of the cell space to be the target. For example, when the same cell space is measured several times in accordance with the predetermined condition, it is possible to reduce the influence of a moving object accidentally present in the cell space on the evaluation value.

A second example aspect of the present disclosure is a control program of an environment arrangement robot for arranging an environment of a target space in which a mobile robot autonomously moves. The control program causes a computer to execute: measuring, by a distance sensor, a distance to an object present nearby while operating a movement mechanism and the environment arrangement robot autonomously moves in the target space; dividing the target space into a plurality of cell spaces and providing an evaluation value to each of the cell spaces based on a result of the measurement of the distance sensor obtained in the measuring to thereby create an environment map of the target space, the evaluation value indicating a probability of whether or not there is an object in the corresponding cell space; and changing, among the plurality of cell spaces, a specific cell space having the evaluation value within a range evaluated that the probability of whether or not there is an object in the specific cell is low in such a way that the probability that the object is present will become greater or change a surrounding cell space in such a way that the specific cell space will be excluded from the measurement by the distance sensor.

When the environment arrangement robot is operated by such a control program, the target space is arranged, and the autonomous mobile robot that autonomously moves later on can easily recognize the target space. By referring to the environment map created by the environment arrangement robot, the autonomous mobile robot can estimate its own location more accurately. Consequently, the autonomous mobile robot can reach a destination more reliably.

The environment arrangement robot according to the present disclosure creates an environment map of a target space in which a mobile robot autonomously moves and also arranges an environment of the target space. Thus, later on, the mobile robot can estimate its own location more accurately.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, although the present disclosure will be described with reference to embodiments of the present disclosure, the present disclosure according to claims is not limited to the following embodiment. Moreover, all the components described in the following embodiment are not necessarily indispensable for means to solve problems.

Figure 1:
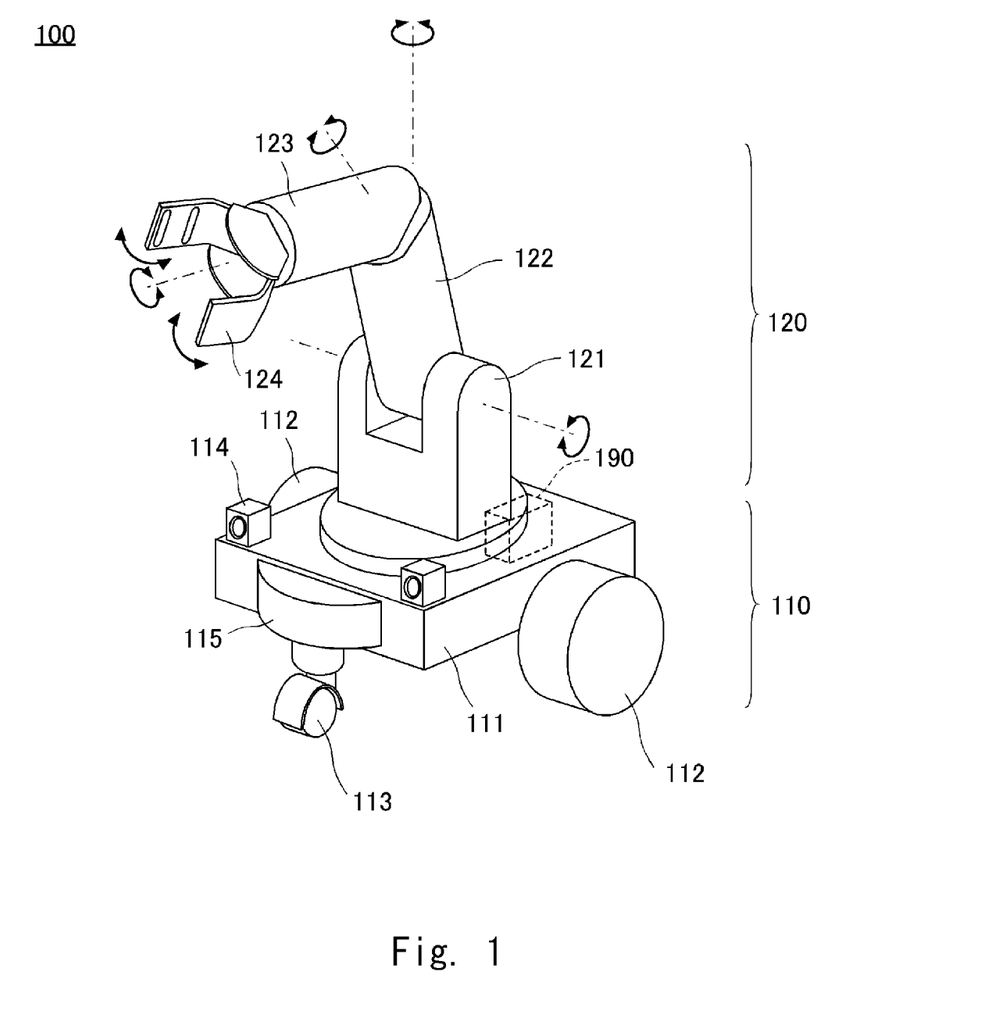
FIG. 1 is an external perspective view of an environment arrangement robot according to an embodiment.

FIG. 1 is an external perspective view of an environment arrangement robot 100 according to this embodiment. The environment arrangement robot 100 is roughly divided into a cart part 110 and an arm part 120.

The cart part 110 is mainly composed of a base 111, two driving wheels 112 attached to the base 111, and one caster 113. The two driving wheels 112 are disposed so that rotational axes thereof coincide on opposite lateral sides of the base 111. Each of the driving wheels 112 is rotated independently by a motor (not shown). The caster 113 is a trailing wheel. The caster 113 is disposed in such a way that a pivot shaft extending from the base 111 in the vertical direction pivotally supports the wheel away from a rotation axis of the wheel. The caster 113 follows the cart part 110 in a direction in which the cart part 110 moves. For example, the environment arrangement robot 100 moves straight if the two driving wheels 112 are rotated at the same rotation speed in the same direction, while it turns around a vertical axis passing through a center of gravity thereof if the two driving wheels 112 are rotated at the same rotation speed in the directions opposite to each other.

Various sensors for detecting obstacles and for recognizing a surrounding environment are provided on the cart part 110. The cameras 114 are one of the sensors. Two of the cameras 114 are disposed on the front side of the base 111. The cameras 114 each include, for example, a CMOS image sensor. The cameras 114 transmit captured image signals to a control unit, which will be described later. A distance sensor 115 is further disposed on the front side of the base 111. The distance sensor 115 is a sensor that measures a distance to an object present nearby. The distance sensor 115 according to this embodiment is a rider that measures the distance to a projection point by projecting a laser beam while scanning it in the horizontal cross section direction and detecting reflected light. The details will be described later.

A control unit 190 is provided in the cart part 110. The control unit 190 includes a control unit, a memory, and the like, which will be described later.

The arm part 120 is mainly composed of a plurality of arms 121, 122, and 123 and a hand 124. One end of the arm 121 is rotatably supported by the base 111 in such a way that the arm 121 is rotatable around the vertical axis. One end of the arm 122 is rotatably supported by the other end of the arm 121 in such a way that the arm 122 is rotatable around a horizontal axis. One end of the arm 123 is rotatably supported by the other end of the arm 122 in such a way that the arm 123 is rotatable in a radial direction at the other end of the arm 122. The hand 124 is rotatably supported by the other end of the arm 123 in such a way that the hand 124 is rotatable around a central axis parallel to a direction in which the arm 123 is extended.

The hand 124 includes a holding mechanism so as to be able to hold a conveying object such as a shielding material for the environment arrangement robot 100, which will be described later. The environment arrangement robot 100 is not limited to conveying the conveying object but instead can be employed for various purposes. The arm part 120 holds various workpieces according to a task given to the environment arrangement robot 100.

Figure 2:
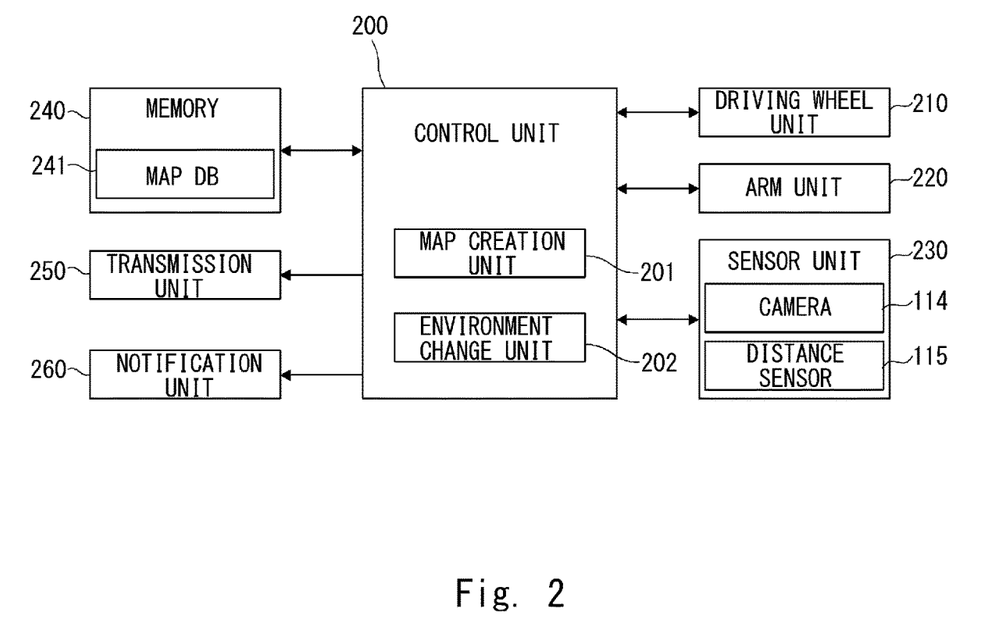
FIG. 2 is a control block diagram of the environment arrangement robot.

FIG. 2 is a control block diagram of the environment arrangement robot 100. The control unit 200 is, for example, a CPU. The system control unit 200 transmits and receives information such as commands, sampling data, and the like to and from a driving wheel unit 210, an arm unit 220, a sensor unit 230, a memory 240, a transmission unit 250, a notification unit 260, and the like, whereby the control unit 200 executes various calculation related to control of the mobile robot 10.

The driving wheel unit 210 is provided in the cart part 110. The driving wheel unit 210 includes a driving circuit and a motor for driving the driving wheels 112, an encoder for detecting an amount of rotation of the motor, and the like. The driving wheel unit 210 functions as a movement mechanism for autonomous movement. The control unit 200 transmits a driving signal to the driving wheel unit 210 to thereby execute rotation control of the motor. Further, the control unit 200 receives a detection signal of the encoder to thereby calculate a moving speed, a moving distance, a turning angle, and the like of the environment arrangement robot 100.

The arm unit 220 is provided in the arm part 120. The arm unit 220 includes a driving circuit for driving the arms 121, 122, and 123 and the hand 124, an actuator, an encoder for detecting an operation amount of the actuator, and the like. The control unit 200 transmits a driving signal to the arm unit 220 to thereby operate the actuator and execute posture control and hold control of the arm part 120. The control unit 200 receives the detection signal of the encoder to thereby calculate an operating speed, an operating distance, a posture and the like of the arm part 120.

The sensor unit 230 includes various sensors in addition to the cameras 114 and the distance sensor 115. These sensors are dispersedly disposed on the cart part 110 and the arm part 120. The control unit 200 transmits a control signal to each sensor to thereby obtain its output. For example, the cameras 114 execute a capture operation in accordance with the control signal from the control unit 200 and transmit captured frame image data to the control unit 200. Moreover, the distance sensor 115 transmits, in accordance with a request signal from the control unit 200, a projection direction of the laser beam and a distance from a reference position to a target to the control unit.

The memory 240 is a non-volatile storage medium. For example, a solid state drive is used as the memory 240. The memory 240 stores a control program for controlling the environment arrangement robot 100, various parameter values, functions, lookup tables, and the like used for control. In particular, the memory 240 includes a storage area for a map DB 241. The map DB 241 is a database in which various pieces of map information for autonomous movement are described.

The transmission unit 250 transmits various pieces of information and control signals to external devices and other autonomous mobile robots under the control of the control unit 200. The transmission unit 250 is, for example, a wireless LAN unit. It is obvious that the transmission unit 250 may include a function as a reception unit. In this embodiment, the transmission unit 250 is responsible for transmitting the created environment map to other autonomous mobile robots.

The notification unit 260 is responsible for notifying a user of a state of the environment arrangement robot 100 and surrounding circumstances. The notification unit 260 is, for example, a speaker or a display panel. The notification unit 260 notifies the user of contents to be transmitted to the user by using voice, characters, and videos. The notification unit 260 may be a transmission unit that transmits the notification contents to a terminal device carried by a user. In this case, the transmission unit 250 may include the function of the notification unit 260.

The control unit 200 also functions as a function execution unit that executes various calculations related to the control and execute the control. The map creation unit 201 executes the control program. The control program operates the distance sensor while searching the target space, calculates an evaluation value indicating the probability of presence/absence of an object, and creates the environment map. Further, when there is a space where it is uncertain whether the object is present or not in the target space, an environment change unit 202 executes a control program for changing the environment. Details will be described later.

Figure 3:
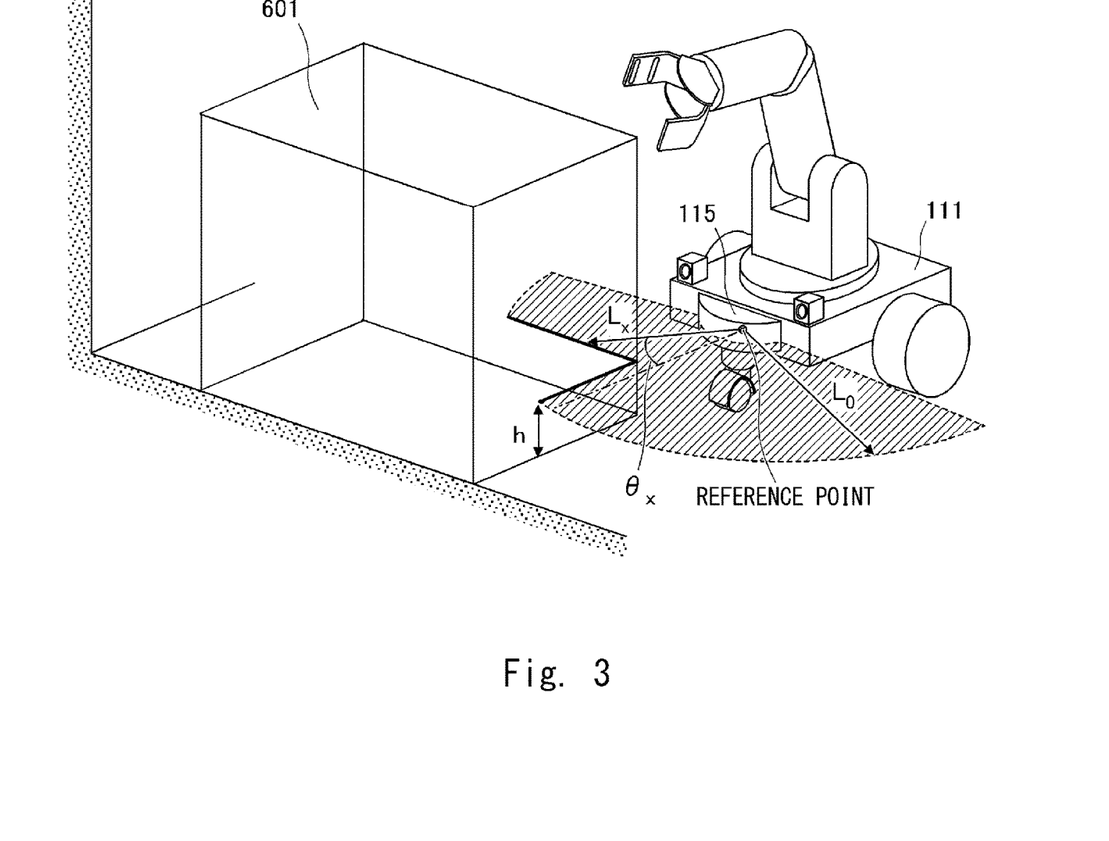
FIG. 3 is a diagram illustrating a state of distance measurement using a distance sensor.

FIG. 3 is a diagram for describing a state of distance measurement using the distance sensor 115. The distance sensor 115, which is a rider, projects the laser beam in a horizontal cross section direction at a height h from a floor surface. To be more specific, for example, micromirrors are driven to scan the laser beam in a range of about 180 degrees in front of the base 111. Then, reflected light with respect to the scanned projected light is detected to thereby calculate the distance to a reflection point.

The distance sensor 115 can detect the distance from a laser projection unit, which is a reference point, to the object if the object is present within the distance $L_0$. That is, a detection area is a forward range of about 180 degrees and a radius $L_0$ around the reference point. As shown in FIG. 3, when an object 601 is present within the detection area, detection points at which the distances thereof have been measured appear continuously on the surface of the object 601 in a straight line (bold lines in FIG. 3). At this time, the distance sensor 115 outputs the projection direction of the laser and the distance from the reference point for each detection point. The projection direction of the laser is, for example, an angle formed by the laser with respect to the front direction. In the illustrated example of the detection points, the distance is $L_x$ and the projection direction is $\theta_x$. When the distance sensor 115 cannot detect the object within the range of the distance $L_0$, it outputs a result indicating that there is no detected object.

The distance sensor 115 outputs a verification value indicating the probability of the detection result in addition to the projection direction of the laser and the distance from the reference point. For example, when intensity of the reflected light is large, a large value is given to the verification value indicating that the distance is accurately detected. Conversely, when the intensity of the reflected light is small, a small value is given to the verification value indicating that the distance is uncertain. When a method of performing scans a plurality of times and outputting the detection results is adopted, and if variations in the respective detection results are small, a large value is given to the verification value. Conversely, when the variations in the respective detection results are large, a small value is given to the verification value.

Specifically, for example, when laser is projected on a transparent glass, as the reflectance on the surface of the transparent glass is low, the intensity of the reflected light to be detected is low. In addition, when the surface of the object is vibrating or a material of the object absorbs laser beams, the detection result varies or the intensity of the reflected light becomes low. That is, the detected result may become uncertain depending on the state or material of the surface of the object irradiated with the laser beam. In such a case, a small value is given to the verification value.

In this embodiment, the environment arrangement robot 100 creates the environment map of the target space based on the output of the distance sensor 115. The environment map to be created divides the target space into a plurality of cell spaces. The evaluation value indicating the probability of whether or not there is an object occupying at least a part of the corresponding cell space is given to each of the cell spaces. The evaluation value to be given to each cell space is calculated based on the output of the distance sensor 115, which has been obtained while the environment arrangement robot 100 autonomously moves around the target space. Note that the target space of this embodiment is a space of a horizontal cross section at the height h from the floor surface, which is measured by the distance sensor 115.

The created environment map is used later on when the autonomous mobile robot, which autonomously moves in the target space and executes tasks such as works, performs calculation for self-location estimation in which the autonomous movement robot estimates its own location in the target space. More specifically, the autonomous mobile robot can recognize where the autonomous mobile robot is located in the environment by checking the output obtained by its own distance sensor 115 against the environment map received from the environment arrangement robot 100. That is, prior to the mobile robot executing the task in the target space, the environment arrangement robot 100 plays a role of searching the space, creating the environment map, and handing it over to the mobile robot. When the environment arrangement robot 100 also plays a role of executing the task, it may execute the task while estimating its own location using the environment map created by the environment arrangement robot 100 itself.

Figure 4:
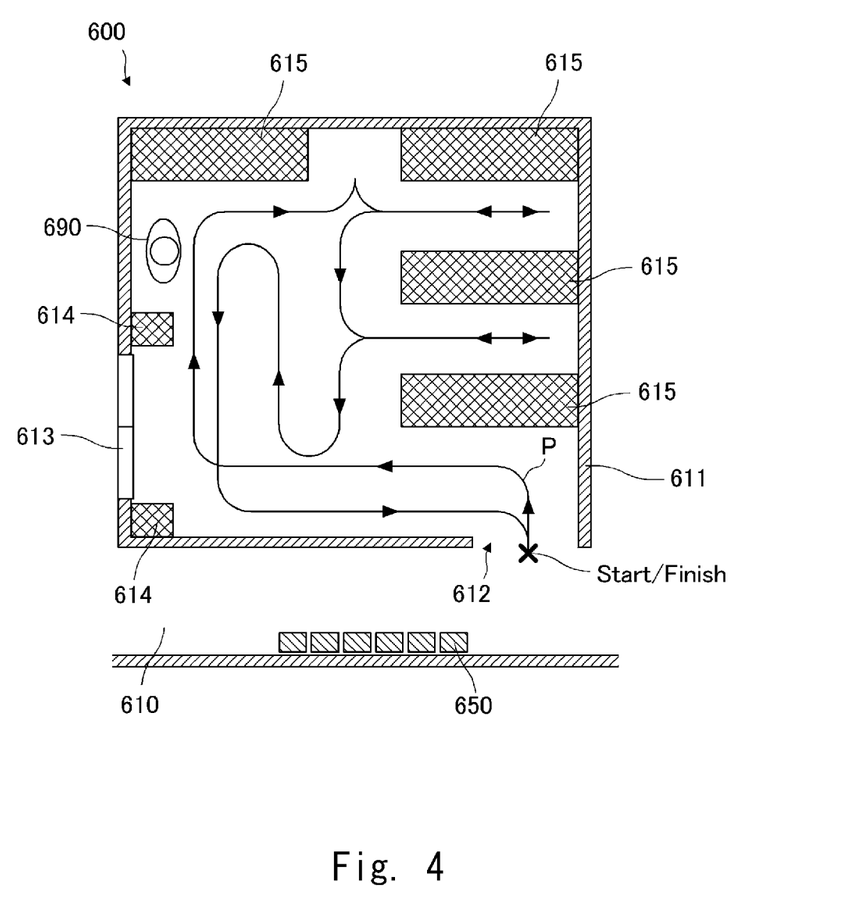
FIG. 4 is a diagram showing an example of a target space and a space search for creating an environment map.

A specific procedure for creating the environment map will be described. The map creation unit 201 executes the control program for creating the environment map to create the environment map. FIG. 4 is a diagram showing an example of the target space for creating the environment map and the space search. As described above, the target space is the space of the horizontal cross section at the height h from the floor surface on which the distance sensor 115 is disposed. FIG. 4 is a schematic diagram overviewing the entire environment including a target area 600 in which the environment arrangement robot 100 moves around.

The target area 600 for which the environment map is to be created is a room adjacent to a passage area 610. The entire target area 600 is surrounded by a wall 611, and a part facing the passage area 610 is an entrance 612 that allows the environment arrangement robot 100 to pass between the passage area 610 and the entrance 612. A part of the wall 611 is composed of a transparent glass door 613. There are a plurality of pillars 614 in the target area 600. In addition, a plurality of shelves 615 are installed. A person 690 occasionally performs works in the target area 600. In the passage area 610, shielding materials 650, which will be described later, are stored side by side.

The environment arrangement robot 100 autonomously moves while finding a path through which the environment arrangement robot 100 can pass. The environment arrangement robot 100 evaluates whether or not it can pass through the path by obtaining outputs of sensors such as the cameras 114 and the like and determining whether or not there is an obstacle in a traveling direction. It is obvious that the environment arrangement robot 100 may refer to the output of the distance sensor 115 to make the evaluation.

The environment arrangement robot 100 monitors the driving wheel unit 210 and executes autonomous movement while recognizing its own location by dead reckoning. For example, the environment arrangement robot 100 moves everywhere as thoroughly as possible along a path P inside the target area 600 shown in FIG. 4. In parallel to the moving of the environment arrangement robot 100, the environment arrangement robot 100 stops in spots along the path P to operate the distance sensor 115 and detects as to whether or not there is an object in the hatched range of FIG. 3 with respect to the traveling direction. More specifically, the environment arrangement robot 100 obtains the position of the reference point at the time of sensing, the projection direction of the laser beam, the distance to the detected target, and the verification value of the detected target. Then, the environment arrangement robot 100 calculates the probability that the target is present and the cell space of the target area 600 in which the target is present.

Figure 5:
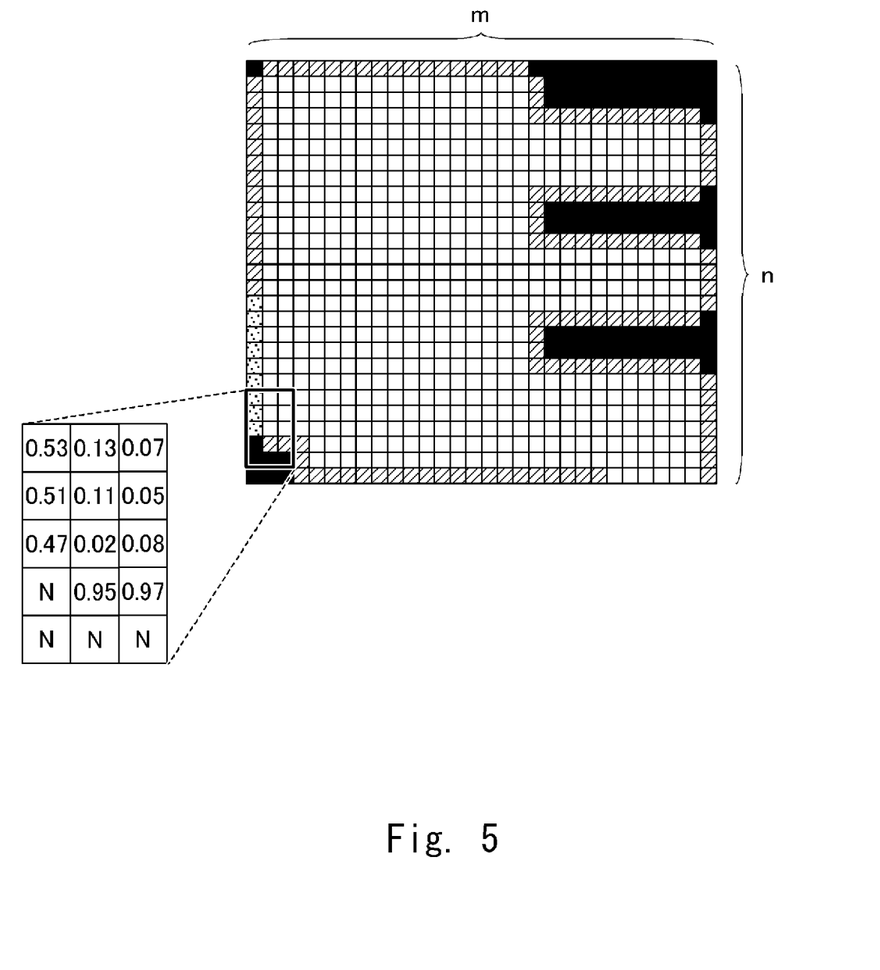
FIG. 5 is a diagram for describing the environment map created by the space search.

FIG. 5 is a diagram for describing the environment map created through the space search as described above. The target area 600 is defined as a set of cell spaces divided into m×n in one layer including the horizontal cross section at the height h from the floor surface.

The map creation unit 201 evaluates that there is no object in the cell space through which the laser beam projected by the distance sensor 115 has passed whereas it evaluates that there is an object in the cell space where the laser beam is reflected. Further, it is assumed that the presence/absence of the object cannot be confirmed in the cell space far from the cell space where the laser beam is reflected. The map creation unit 201 evaluates the cell space through which the laser beam has passed and the cell space in which the laser beam is reflected based on the position of the reference point at the time of sensing, the projection direction of the laser beam, and the distance to the detected object. When the distance sensor 115 does not detect the object, the cell space included within the range of $L_0$, which is the detectable distance from the reference point, is evaluated to be the cell space in which the object is not present.

Further, as described above, since the verification value is included in a result of the sensing, the map creation unit 201 calculates the evaluation value of each cell space based on the verification value. The evaluation value is a value indicating the probability of whether or not there is an object occupying at least a part of the corresponding cell space for each of the cell spaces.

For example, when the evaluation value is any value from 0 or greater and 1 or less, and "0" indicates "no object is present" and "1" indicates that "an object is present", an intermediate value of "0.5" means that "presence/absence of an object is unknown". Therefore, the closer the value is to "0", the more certain it is that "no object is present", while the closer the value is to "1", the more certain it is that "object is present". Conversely, the closer the value it is to the intermediate value of "0.5", the more it can be said that "presence/absence of an object is unknown".

The verification value indicating the probability of the detection result is a small value when, for example, a transparent glass is detected as in the case above. In other words, the verification value can be regarded as representing the probability that the object is present at the detection point. Therefore, when the verification value is large, the evaluation values close to "1" may be given to the cell spaces including the detection points, and the evaluation values close to "0" can be given to the cell spaces therebetween. Conversely, when the verification value is small, the evaluation values close to "0.5" may be given to both the cell spaces including the detection points and the cell spaces therebetween. That is, the map creation unit 201 can convert the verification value output by the sensing into the evaluation value given to each cell space by using a predetermined conversion formula.

In addition, due to the autonomous movement of the environment arrangement robot 100, the distance sensor 115 may project the laser beams many times in the same cell space. In such a case, the evaluation value of the related cell space may be updated according to the detection result. For example, the map creation unit 201 can set an average value of the previously calculated evaluation value and the newly calculated evaluation value as the latest evaluation value.

Each cell space shown in FIG. 5 has the evaluation value calculated in this way. The cell spaces having the evaluation values close to "0" are shown in white, and the cell spaces having the evaluation value close to "1" are hatched. Further, the cell spaces having the evaluation values close to "0.5" are shown in dots, and the cell space in which the presence or absence of an object cannot be confirmed are shown in black. Some of the lower left cell spaces are enlarged to show specific numeric values given to the respective cell spaces.

As shown in FIG. 4, as there is the glass door 613 at the lower left corner, each of the evaluation value of the cell space corresponding to the glass door 613 is a value close to "0.5". On the other hand, the evaluation values of the cell spaces corresponding to the pillars 614 are values close to "1", indicating that the object is present at these positions more reliably. As shown in FIG. 4, although the person 690 as a moving object is temporarily present at the upper left of the target area 600, by performing the sensing over and over along the path P, the influence of the person 690 is successfully reduced. That is, even when there is a moving object at a certain point, if it moves afterwards, it is possible to reduce the influence of the moving object by performing the sensing a plurality of times at different times and angles.

As described above, the environment map is used later on for the self-position estimation of the mobile robot that autonomously moves. However, when there is a cell space (referred to as a "specific cell space") having the evaluation value close to "0.5", any result of the sensing in the cell space obtained by the mobile robot will not be a material for the evaluation of the self-location estimation. The autonomous mobile robot sometimes cannot accurately recognize the current location and unable to reach the destination. Therefore, the environment arrangement robot 100 of this embodiment changes the environment so that the specific cell space is physically shielded and is excluded from the cell spaces to be sensed by the distance sensor 115.

Figure 6:
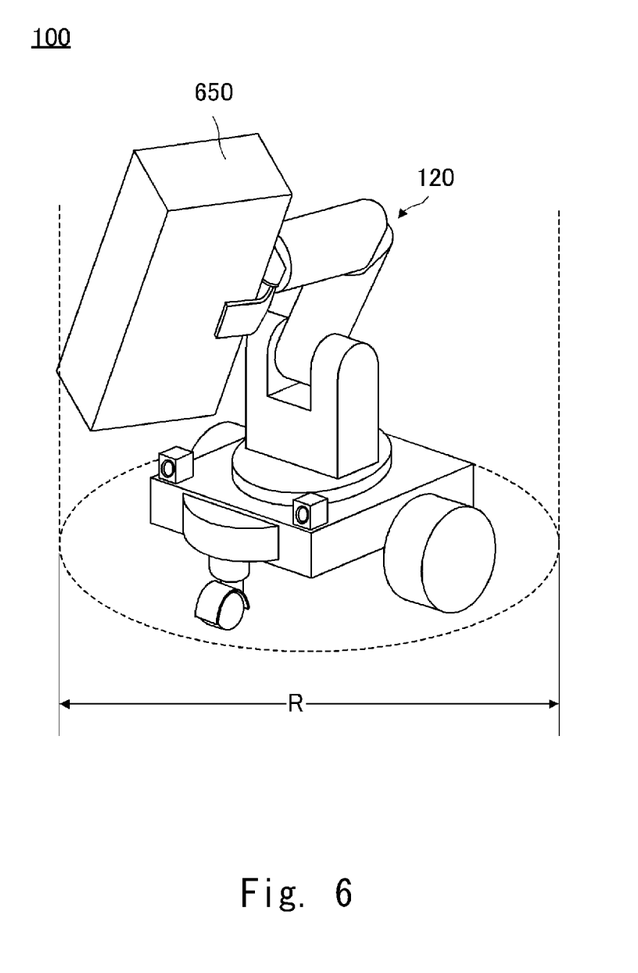
FIG. 6 is an external perspective view of the environment arrangement robot that transports shielding materials.

More specifically, the environment change unit 202 executes the control program for transporting and disposing the shielding materials 650 to shield the specific cell space with the shielding material 650. FIG. 6 is an external perspective view of the environment arrangement robot 100 that transports the shielding material 650.

The shielding material 650 is, for example, a rectangular parallelepiped cardboard and is held by the arm part 120. The arm part 120 assumes a posture in which a projection of the environment arrangement robot 100 in the state of holding the shielding material 650 (a shadow cast on a traveling surface from a vertical direction) falls within a radius R. The environment change unit 202 searches for a path through which the projection with the radius R can pass using the already created environment map and transports the shielding material 650 from the passage area 610 to the position where the specific cell space is shielded.

Figure 7:
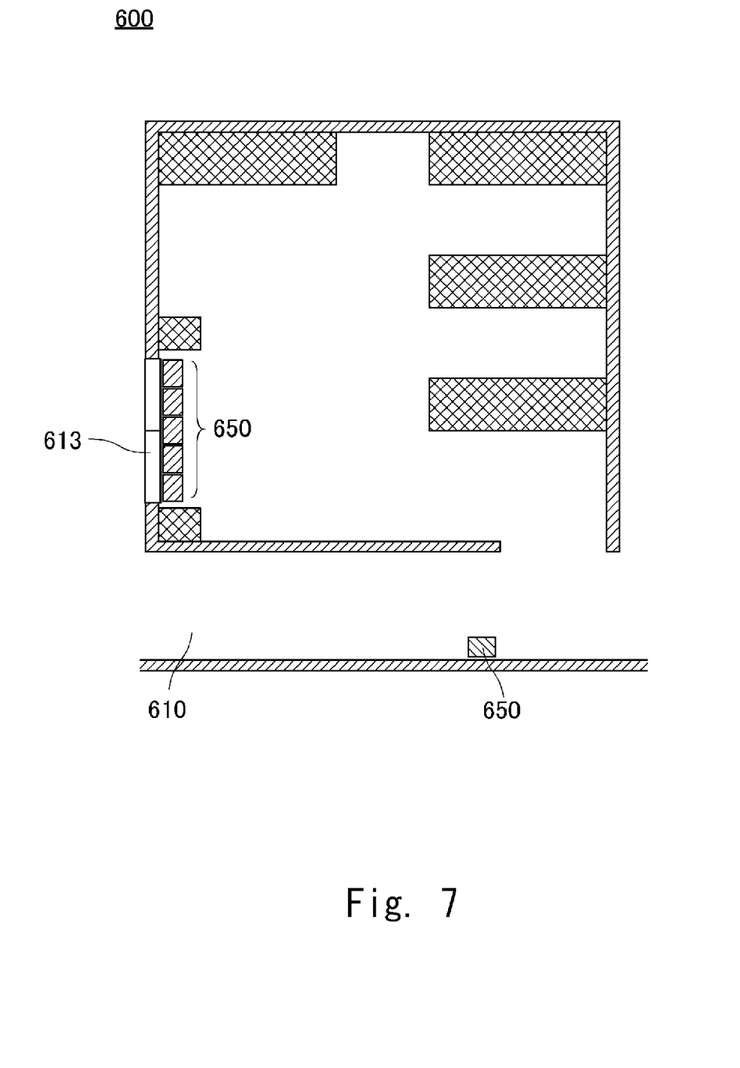
FIG. 7 is a diagram showing a target space in which a specific cell space is shielded by shielding materials.

FIG. 7 is a diagram showing the target space in which the specific cell space is shielded by the shielding materials 650. FIG. 7 is an overview diagram similar to FIG. 4. As shown in FIG. 7, when the inside of the glass door 613 is covered with the shielding materials 650, the mobile robot that autonomously moves in the target area 600 will no longer sense the glass door 613. That is, it can be said that the environment arrangement robot 100 is arranging the environment of the target area 600 for the mobile robot. When the environment arrangement robot 100 covers the glass door 613 with the shielding materials 650, the environment arrangement robot 100 operates the distance sensor 115 to update each evaluation value given to the cell space near the glass door 613.

Figure 8:
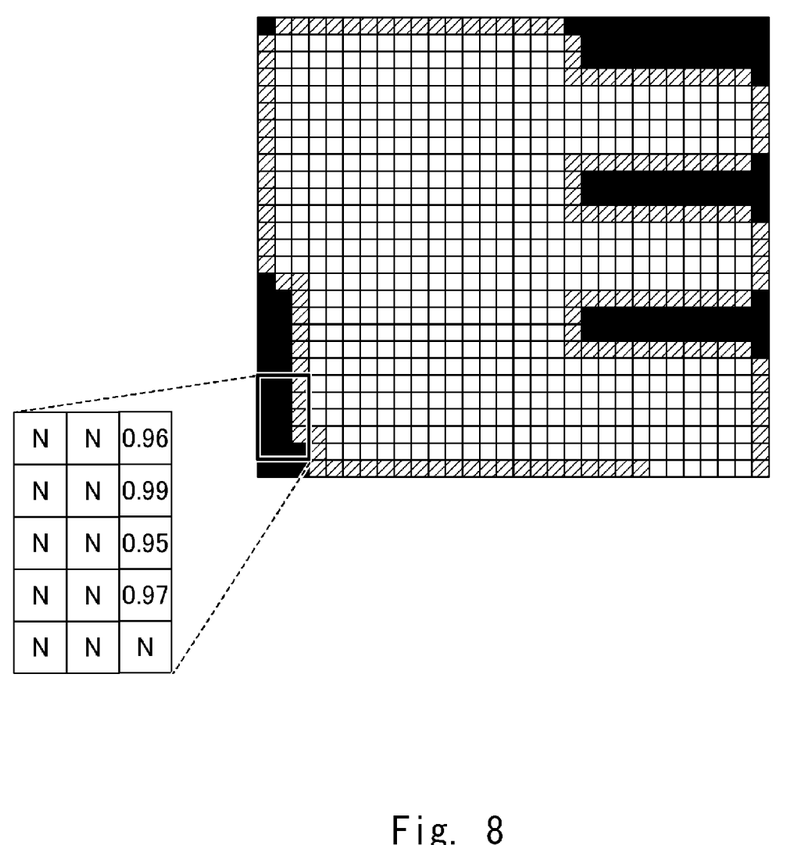
FIG. 8 is a diagram for describing the environment map created after the environment is changed.

FIG. 8 is a diagram for describing the environment map created after the environment is changed. The environment map shown in FIG. 8 is illustrated in a manner similar the environment map shown in FIG. 5. It can be seen that the surface material of the shielding materials 650 is a material that appropriately scatters the laser beam, and the evaluation values close to "1" are given to the cell spaces where the shielding materials 650 are disposed. The environment map created after the environment is changed does not include the cell spaces of "presence/absence of an object is unknown". Thus, the mobile robot can estimate its own location more accurately when it receives such an environment map and refers to the environment map.

Here, as an example of the environment change unit 202 changing the surrounding cell spaces so that the specific cell space will not be sensed by the distance sensor 115, an example in which the specific cell space is shielded by the shielding materials 650 has been described. However, the example of changing the surrounding cell spaces is not limited to this. For example, existing furniture and fixtures may be moved around the specific cell space.

Further, for example, an adhesive sheet for appropriately scattering the laser beams may be prepared and attached to the surface of the glass door 613. When the attachment to the glass door 613 is successful, the specific cell spaces corresponding to the glass door 613 can be changed to normal cell spaces having the evaluation values close to "1". That is, the environment change unit 202 may change the specific cell space itself having the evaluation value close to "0.5" so that the evaluation value will become close to "1" or "0", i.e., the probability of the evaluation value of the presence/absence of the object will become larger.

Figure 9:
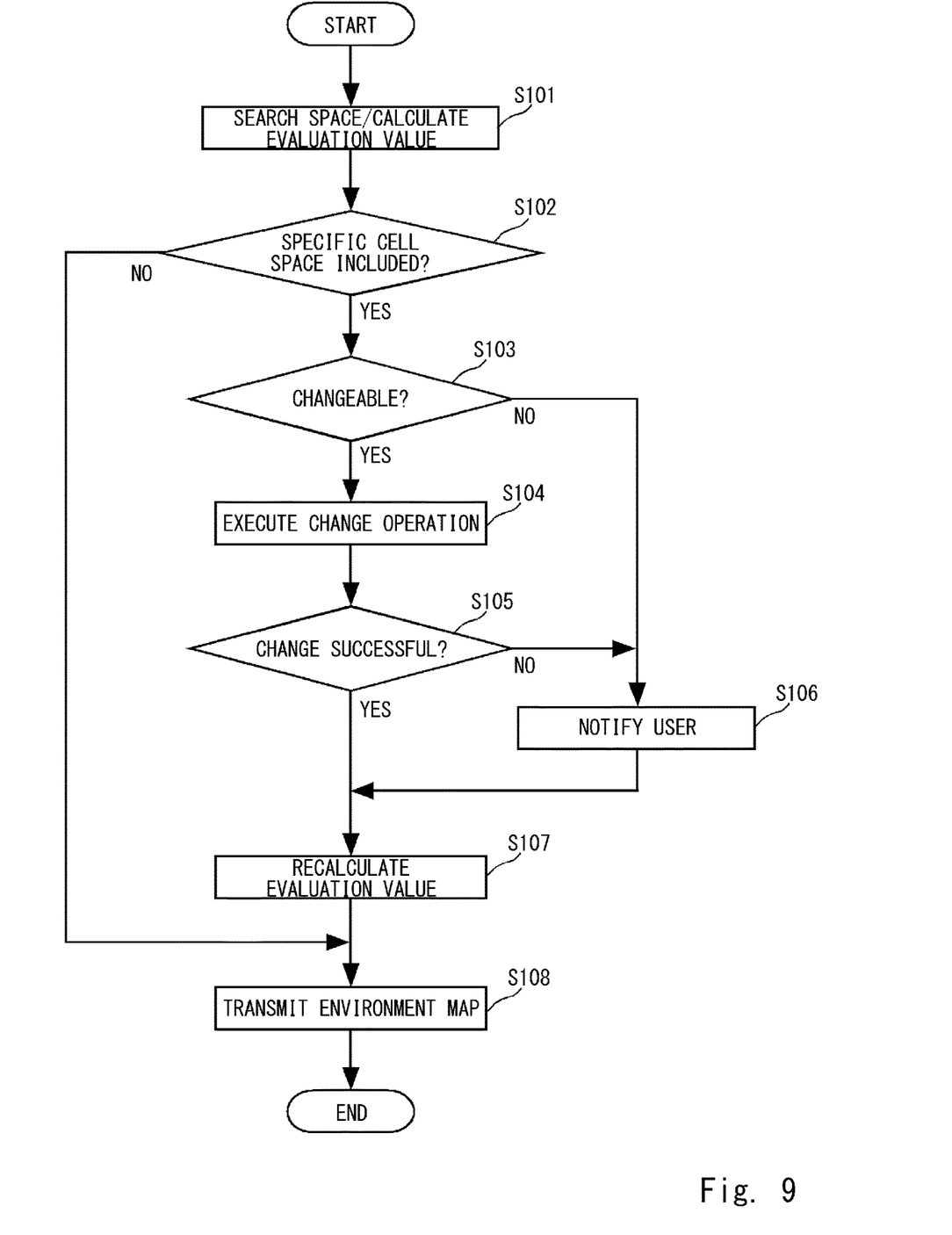
FIG. 9 is a flowchart illustrating a processing flow of the environment arrangement robot.

Next, a processing flow of the environment arrangement robot 100 will be described. FIG. 9 shows the processing flow of the environment arrangement robot. The flow starts from the time when the environment arrangement robot 100 reaches a movement start point shown in FIG. 4.

First, in Step S101, the map creation unit 201 of the control unit 200 creates the environment map as shown in FIG. 5. Specifically, as shown in FIG. 4, sensing is executed by the distance sensor 115 while the target space is searched, and the evaluation value of each cell space is calculated from the measurement result. Then, the calculation of the evaluation value is continued until the environment arrangement robot 100 returns to the movement start point, and the environment map is temporarily completed at the time when the environment arrangement robot 100 returns to the movement start point.

In Step S102, the control unit 200 evaluates as to whether or not the specific cell space is included in the created environment map. Specifically, as described above, when the evaluation value is given within the range of 0 to 1, for example, the cell space having the evaluation value falling within the predetermined range of 0.35 or greater and less than 0.65 is evaluated as the specific cell space. When it is determined that the specific cell space is not included in the created environment map, the process proceeds to Step S108, whereas when it is determined that the specific cell space is included in the created environment map, the process proceeds to Step S103.

In Step S103, the control unit 200 evaluates as to whether or not the cell space to be the target can be changed by the environment change unit 202. More specifically, as described above, it is evaluates as to whether or not the state of the specific cell space itself can be changed or the state of the cell space near the specific cell space can be changed. When it is evaluated that neither one of the state of the specific cell space and the state of the cell space near the specific space can be changed, the process proceeds to Step S106. When it is evaluated that one of the state of the specific cell space and the state of the cell space near the specific space can be changed, the process proceeds to Step S104.

In Step S104, the environment change unit 202 attempts to change the cell space to be the target. According to the example described with reference to FIG. 6, the shielding materials 650 are disposed in the cell space near the specific cell space to attempt to change the specific cell space so that it will not be sensed by the distance sensor. Then, the process proceeds to Step S105 where it is evaluated as to whether or not the change has been successful. When it is evaluated that the attempt for the change has failed, the process proceeds to Step S106, whereas when it is evaluated that the attempt for the change has been successful, the process proceeds to Step S107.

In Step S106, the control unit 200 notifies the user via the notification unit 260 that the cell space to be the target cannot be changed or that the cell space to be the target has failed to be changed. When the notification unit 260 includes a display unit, the state of the cell space to be the target may be captured by the cameras 114 and the image may be displayed on the display unit. The user may change the cell space to be the target by, for example, attaching an adhesive sheet on the glass door by himself/herself.

In Step S107, the map creation unit 201 performs the sensing by the distance sensor 115 again on the cell space to be the target and recalculates the evaluation value. Then, the map creation unit 201 updates the environment map to the latest environment map.

The control unit 200 transmits the environment map created by the map creation unit 201 to the mobile robot that will execute the task in the target area 600 later on via the transmission unit 250. When the transmission of the environment map is completed, a series of processing is ended.

In the embodiment described above, the map creation unit 201 continues to create the environment map until the environment arrangement robot 100 starts from the movement start point and then returns to near the specific cell space and changes the cell space to be the target. As described above, when the environment map is continuously created until a predetermined condition is satisfied, for example, it is possible to measure the same cell space several times and thereby to reduce the influence of a moving object accidentally present such as an operator on the evaluation value. In this case, the predetermined condition may be, in addition to the condition specifying the time from start to return, the conditions such as performing the sensing a plurality of times at intervals of a certain period of time and continuing the sensing for a specified period of time.

In the embodiment described above, a rider is employed as the distance sensor 115. However, the distance sensor 115 may not be a rider. As long as it is a distance sensor capable of measuring the distance to the target, it may be an ultrasonic sensor, a distance image sensor, or the like. Alternatively, the distance sensor may not be a single distance sensor having a scanning mechanism and it may instead be, for example, a distance sensor array in which the sensors are oriented in directions different from one another.

In the above embodiment, the environment map having the target space as one layer of the horizontal cross section is created. Alternatively, an environment map defined by three-dimensionally divided cell spaces may be created. When the environment map is used for estimating a location of the mobile robot, unlike the environment map for avoiding obstacles, the environment map of one layer of the horizontal cross section is sufficient for that purpose. However, when the three-dimensional environment map can be used in this case, the accuracy of the self-location estimation can be improved. Moreover, the three-dimensional environment map can be conveniently used for avoiding obstacles. Note that when the three-dimensional environment map is to be created, a distance sensor capable of scanning also in the height direction may be employed or a plurality of distance sensors may be disposed in the height direction.

The control program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the present disclosure thus described, it will be obvious that the embodiments of the present disclosure may be varied in many ways. Such variations are not to be regarded as a departure from the spirit and scope of the present disclosure, and all such modifications as would be obvious to one skilled in the art are intended for inclusion within the scope of the following claims.

What is claimed is:

1. An environment arrangement robot for arranging an environment of a target space in which a mobile robot autonomously moves, the environment arrangement robot comprising:
    a movement mechanism for autonomous movement;
    a distance sensor configured to measure a distance to an object present nearby;
    a map creation unit configured to divide the target space into a plurality of cell spaces and provide an evaluation value to each of the cell spaces based on a result of the measurement of the distance sensor obtained while the environment arrangement robot autonomously moves in the target space to thereby create an environment map of the target space, the evaluation value indicating a probability of whether or not there is an object in the corresponding cell space; and
    an environment change unit configured to change, among the plurality of cell spaces, a specific cell space having the evaluation value within a range evaluated that the probability of whether or not there is an object in the specific cell space is low in such a way that the probability that the object is present will become greater or change a surrounding cell space in such a way that the specific cell space will be excluded from the measurement by the distance sensor.

2. The environment arrangement robot according to claim 1, wherein the map creation unit updates the evaluation value of the specific cell space and the evaluation value of a cell space near the specific cell space changed by the environment change unit based on a remeasurement result of the distance sensor.

3. The environment arrangement robot according to claim 1, further comprising a transmission unit configured to transmit the environment map created by the map creation unit to the mobile robot.

4. The environment arrangement robot according to claim 1, wherein the environment map is a map of one horizontal cross section of the target space.

5. The environment arrangement robot according to claim 1, wherein the environment change unit attempts to attach a predetermined attaching object to the specific cell space.

6. The environment arrangement robot according to claim 1, wherein the environment change unit attempts to dispose materials for shielding the specific cell space.

7. The environment arrangement robot according to claim 1, further comprising a notification unit configured to notify, when the change of the cell space targeted by the environment change unit fails, a user of the failure.

8. The environment arrangement robot according to claim 1, further comprising a notification unit configured to notify, when the cell space targeted by the environment change unit cannot be changed, a user that the cell space targeted by the environment change unit cannot be changed.

9. The environment arrangement robot according to claim 1, wherein after the map creation unit creates the environment map until a predetermined condition is satisfied, the environment arrangement robot moves to near the specific cell space, and the environment change unit executes the change of the cell space to be the target.

10. A non-transitory computer readable medium storing a control program of an environment arrangement robot for arranging an environment of a target space in which a mobile robot autonomously moves, the control program causing a computer to execute:

measuring, by a distance sensor, a distance to an object present nearby while operating a movement mechanism and the environment arrangement robot autonomously moves in the target space;

dividing the target space into a plurality of cell spaces and providing an evaluation value to each of the cell spaces based on a result of the measurement of the distance sensor obtained in the measuring to thereby create an environment map of the target space, the evaluation value indicating a probability of whether or not there is an object in the corresponding cell space; and changing, among the plurality of cell spaces, a specific cell space having the evaluation value within a range evaluated that the probability of whether or not there is an object in the specific cell space is low in such a way that the probability that the object is present will become greater or change a surrounding cell space in such a way that the specific cell space will be excluded from the measurement by the distance sensor.

* * * * *